United States Patent
Todd et al.

(10) Patent No.: US 10,567,234 B1
(45) Date of Patent: Feb. 18, 2020

(54) POINT OF ORIGIN CAPTURE FOR DATA COMPLIANCE MANAGEMENT IN CLOUD COMPUTING ENVIRONMENT

(71) Applicant: EMC IP Holding Company LLC, Hopkinton, MA (US)

(72) Inventors: Stephen J. Todd, Shrewsbury, MA (US); Kenneth Durazzo, San Jose, CA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 15/895,622

(22) Filed: Feb. 13, 2018

(51) Int. Cl.
*G06F 16/00* (2019.01)
*H04L 12/24* (2006.01)
*H04L 29/08* (2006.01)

(52) U.S. Cl.
CPC .............. *H04L 41/12* (2013.01); *H04L 67/10* (2013.01); *H04L 67/18* (2013.01)

(58) Field of Classification Search
CPC ......... G06F 17/30418; G06F 17/30185; G06F 17/30371; G06F 21/577; H04L 2209/38; H04L 67/2823; H04L 67/1097; H04L 63/08
See application file for complete search history.

(56) References Cited

U.S. PATENT DOCUMENTS

| | | | |
|---|---|---|---|
| 2018/0188704 A1* | 7/2018 | Cella ..................... | H04Q 9/00 |
| 2018/0227116 A1* | 8/2018 | Chapman ............. | H04L 9/0637 |
| 2019/0179939 A1* | 6/2019 | Govindarajan ..... | G06F 11/3476 |

OTHER PUBLICATIONS

U.S. Appl. No. 15/789,263 filed in the name of Stephen Todd et al., filed Oct. 20, 2017 and entitled "Distributed Data Protection Management in Multi-Cloud Computing Environment."
Satoshi Nakamoto, "Bitcoin: A Peer-to-Peer Electronic Cash System," http://bitcoin.org/bitcoin.pdf, 2008, 9 pages.

* cited by examiner

*Primary Examiner* — Kim T Nguyen
(74) *Attorney, Agent, or Firm* — Ryan, Mason & Lewis, LLP

(57) ABSTRACT

In a cloud computing environment comprising a plurality of cloud platforms within which an enterprise can store at least one data set, the method maintains a distributed ledger system with a plurality of nodes, wherein a given one of the plurality of cloud platforms is operatively coupled to a given one of the plurality of nodes of the distributed ledger system. Further, the method manages data compliance for the at least one data set in association with the distributed ledger system by storing transaction data in the distributed ledger system that represents geographic point of origin metadata associated with the at least one data set.

20 Claims, 7 Drawing Sheets

POINT OF ORIGIN CAPTURE FOR DATA COMPLIANCE MANAGEMENT IN CLOUD COMPUTING ENVIRONMENT

FIELD

The field relates generally to cloud computing environments, and more particularly to techniques for data compliance management in such cloud computing environments.

BACKGROUND

Enterprises such as corporations typically utilize a cloud computing environment to manage their data. One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, enterprises may choose to host their data (as well as applications, workloads, services, etc.) on a combination of private and public clouds that form a multi-cloud computing environment. One or more clouds may also be referred to as a "data center." Alternatively, a data center may be comprised of one or more clouds.

However, governmental agencies have begun to place more stringent storage restrictions on data owned or otherwise managed by individuals and entities within the jurisdictions of the governmental agencies. One example of such a data sovereignty regulation is the General Data Protection Regulation (GDPR) enacted by the European Union that takes effect in 2018. Under GDPR, an enterprise is limited in its ability to select cloud storage locations for content generated in certain regions.

SUMMARY

Embodiments of the invention provide systems and methods for data compliance management in a cloud computing environment.

For example, in one embodiment, a method comprises the following steps. In a cloud computing environment comprising a plurality of cloud platforms within which an enterprise can store at least one data set, the method maintains a distributed ledger system with a plurality of nodes, wherein a given one of the plurality of cloud platforms is operatively coupled to a given one of the plurality of nodes of the distributed ledger system. Further, the method manages data compliance for the at least one data set in association with the distributed ledger system by storing transaction data in the distributed ledger system that represents geographic point of origin metadata associated with the at least one data set.

Advantageously, illustrative embodiments utilize distributed data management techniques in a cloud computing environment to overcome drawbacks associated with existing data compliance approaches.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. As mentioned above, a multi-cloud computing environment employed by an enterprise may comprise a combination of one or more private clouds and one or more public clouds. The term "enterprise" as used herein is intended to be broadly construed, and may comprise, for example, one or more businesses, one or more corporations or any other one or more entities, groups, or organizations. An "entity" as illustratively used herein may be a person or system.

Illustrative embodiments provide techniques for data compliance management in a cloud computing environment. The cloud computing environment may include a wide variety of computing resources that form an information processing system. The term "computing resource," as illustratively used herein, can refer to any device, endpoint, component, element, platform, cloud, data center, storage array, client, server, gateway, or other resource, that is part of a cloud computing environment associated with an enterprise. An example of a cloud computing environment associated with an enterprise is shown in FIG. 1.

Figure 1:
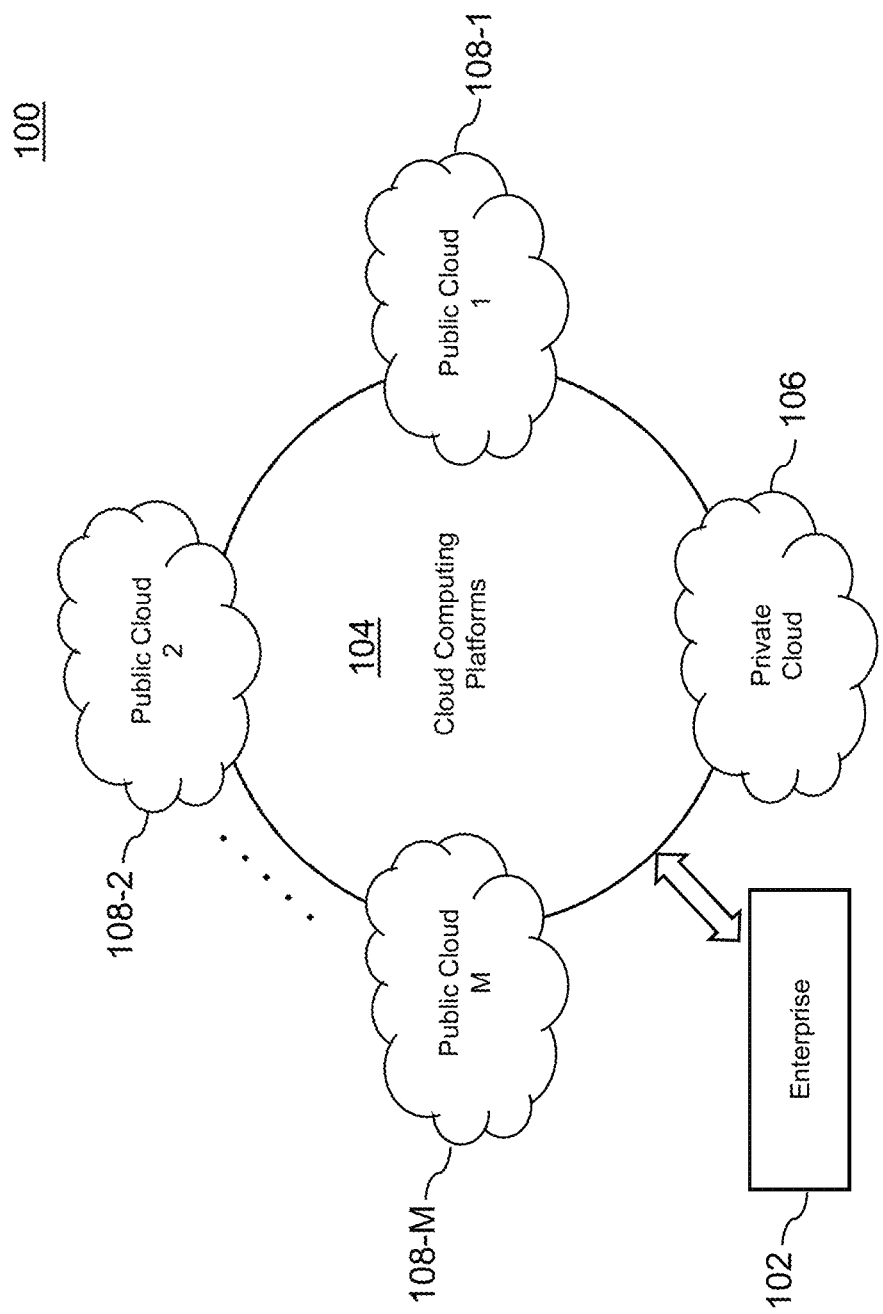
FIG. 1 illustrates a cloud computing environment associated with an enterprise with which one or more illustrative embodiments may be implemented.

As shown in FIG. 1, cloud computing environment 100 comprises an enterprise 102 and a set of cloud computing platforms 104 upon which the enterprise 102 hosts its application programs and data assets. The set of cloud computing platforms 104 comprises a private cloud 106 and a plurality of public clouds 108-1, 108-2, . . . , 108-M. It is to be appreciated, however, that there can be more than one private cloud in the cloud computing environment 100. Still further, the environment 100 can alternatively be composed of only private clouds or only public clouds. Note that specific cloud infrastructure may be purpose-built to serve as a destination for cloud native applications while some may be purpose-built for traditional applications. Examples of public clouds may include, but are not limited to, Amazon Web Services® (AWS), Google Compute Engine® (GCE), and Windows Azure® Services platforms.

There has been a proposal to provide decentralized management of data in cloud computing environments that tracks the creation of data, the type of data being created, where data is being created, the deletion of data, and the value of data in the context of data protection ecosystems. For example, such a system is described in U.S. patent application Ser. No. 15/789,263, entitled "Distributed Data Protection Management in Multi-Cloud Computing Environment" and filed Oct. 20, 2017, the disclosure of which is incorporated by reference herein in its entirety. Such a system facilitates the management of data generated in accordance with a data protection ecosystem, and eventual deletion of data protection copies that may have proliferated across a cloud computing environment. The term "data protection ecosystem" illustratively refers to a system (e.g., comprising devices, subsystems, tools, algorithms, policies, schedules, mappings, catalogs, backup data, etc.) that protects data. By way of example, the data that is being protected may be part of a "production environment" or "primary storage environment," i.e., a data storage environment where data is accessible online by one or more clients such as a private cloud (e.g., 106 in FIG. 1) or a public cloud (e.g., one of public clouds 108-1, 108-2, . . . , 108-M in FIG. 1). Backup data, metadata, and analytics results are obtained during the course of the data protection ecosystem providing data backup and recovery functionalities for the primary storage environment. Data stored by primary or production storage is referred to herein as "primary data," while data stored by data protection ecosystems is referred to herein as "copies of the primary data," "data copies," or simply "copies."

Figure 2:
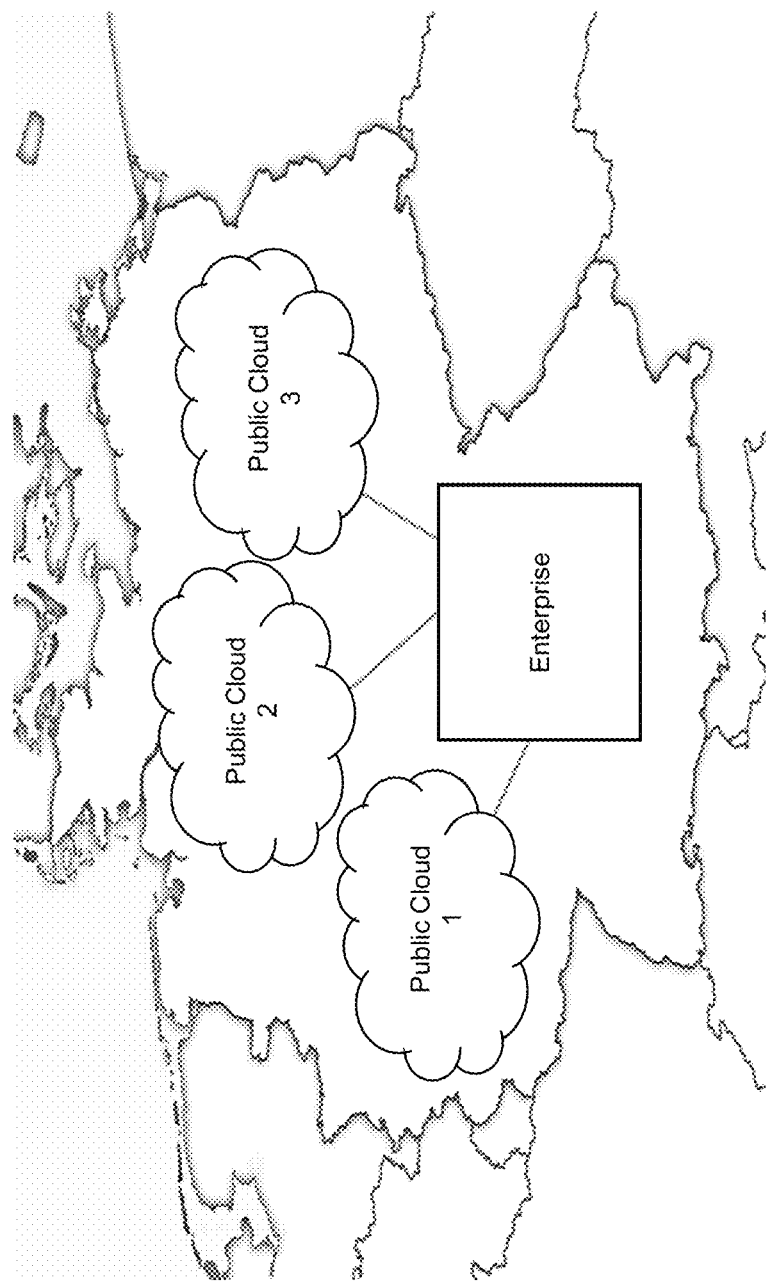
FIG. 2 illustrates a geographic restriction on a cloud computing environment associated with an enterprise with which one or more illustrative embodiments may be implemented.

As mentioned above, data sovereignty regulations have been enacted that are intended to restrict or otherwise prevent movement of primary data and copies of primary data beyond specific geographic boundaries. By way of example only, FIG. 2 illustrates a geographic restriction on a cloud computing environment associated with an enterprise. More particularly, example 200 in FIG. 2 highlights an enterprise that is limited in its ability to select cloud storage locations for content generated in a certain region, e.g. Germany, in this case. Note that the public clouds (1, 2 and 3) that the enterprise can utilize to store data are located geographically within the borders of Germany. This is one use case that will become more and more prevalent to enforce and audit as regions such as Europe move towards implementation of the GDPR, which will start being enforced by May of 2018. The GDPR is a data protection regulation for European Union (EU) citizens that contains language which describes when the regulation applies: The regulation applies if the data controller (organization that collects data from EU residents) or processor (organization that processes data on behalf of data controller e.g., cloud service providers) or the data subject (person) is based in the EU.

Implementing cloud computing environments that comply with these types of regulations are challenging for a number of reasons, many of which are described below.

As data is originally generated, captured, and processed by enterprises that are impacted by these regulations, the following challenges surface.

(i) Point of Origin Disparities

When content is created it may or may not be accompanied by metadata that describes the original geography where the content was initially generated. For example, the list below highlights a variety of different ways (but not all) that geographic metadata may accompany new content: geotagged content (typically latitude, longitude) for content such as photos, videos, short message service data (text messages), etc.; enhanced geospatial data (e.g., drone data) that also contains altitude, bearing, place names, etc.; client Internet Protocol (IP) addresses generated during specific transactions (e.g., browser content generation to a web server); user location coordinates (e.g., user running a cell phone application that is generating non-geotagged content); and phone numbers of scanners generating content and forwarding to a central data center.

(ii) Protocol Disparities

As location metadata arrives from a point of origin, it often does so via a variety of disparate protocols, for example: digital cameras and scanners often use the Exif or XMP formats to describe geographic location; other approaches for digital images may use orthophotos (e.g., aerial photography) where the geo-coordinates of every pixel are well known; for audio/video files, the geo-coordinates may or may not accompany the file but instead are stored separately (examples include Vorbis comment metadata); the rise in the use of unmanned aerial vehicles has resulted in standards such as the MISB Standard 0601, which uses corner points and horizon lines in individual frames; domain name server (DNS) naming systems can communicate geo-coordinates via standards such as RFC1876; and other points of origin, such as phone numbers and/or IP addresses, may be difficult to decipher based on changes to configurations over time.

(iii) Mutability of Geo-Coordinates

Most of the geotagging and protocol approaches described above can be edited without disturbing the actual content that was created. This leads to the potential for altered geo-coordinates to pass audits illegally.

(iv) Notification/Automation for Content Violations

Given the wide variety of location formats and protocols, there is currently no mechanism for highlighting how much content within an enterprise is in violation of regional data protection policies. Similarly, there is no way to automatically feed these violations into a system that can remediate the violations (over time).

(v) Remediation in the Face of Changing Policies

The GDPR regulations that go into effect in May of 2018 are replacing policies that have been in effect in Europe since 1995. European companies have been given a lead time of two years to comply with GDPR. Changes to these policies (e.g., restricting data storage/processing within one country as opposed to one continent) cannot currently be remediated in an automated fashion (in large part due to the disparities of point of origin and protocols as mentioned above).

(vi) Ease of Auditability

Data regulators that wish to enforce regulations by auditing the current location of user content and tracing it back to the original point of capture do not have the tools to do so.

Illustrative embodiments overcome the above and other drawbacks associated with the above challenges by providing improved data compliance management techniques. For example, illustrative embodiments provide point of origin capture techniques to facilitate compliance with data sovereignty regulations that restrict movement of data and/or data copies beyond specific geographic boundaries. As will be further explained, illustrative embodiments employ a geo-extractor (GE) module that recognizes heterogeneous types of geographic point or origin metadata and, in at least some embodiments, normalizes it into a common format/structure. Even if not normalized, the captured geographic point or origin metadata is an important benefit to the data compliance management process. The captured GE metadata (normalized or not) is used to determine the proper placement of the associated data based on one or more geographic-based storage policies (e.g., GDPR) that govern the data placement.

In one illustrative embodiment, a distributed data management ledger system is employed to securely maintain compliance data extracted by the geo-extractor module. Recall that U.S. patent application Ser. No. 15/789,263 describes a technique in which metadata about every copy of data present in a multi-cloud system is captured in a distributed ledger. This distributed data management ledger tracks the creation of data as well as recording the locations and times of any copy of the data being made as well. More particularly, multiple cloud provider data transactions (e.g., from AWS, Google, Azure) are recorded in a chain of blocks. In one exemplary embodiment, data compliance management techniques are adapted to function with a distributed ledger system such as a blockchain.

As used herein, the terms "blockchain," "digital ledger" and "blockchain digital ledger" may be used interchangeably. As is known, the blockchain or digital ledger protocol is implemented via a distributed, decentralized computer network of compute nodes (e.g., blockchain nodes or BCNs). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments of the invention are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, MultiChain, and Hyperledger may be employed in alternative embodiments.

Figure 3:
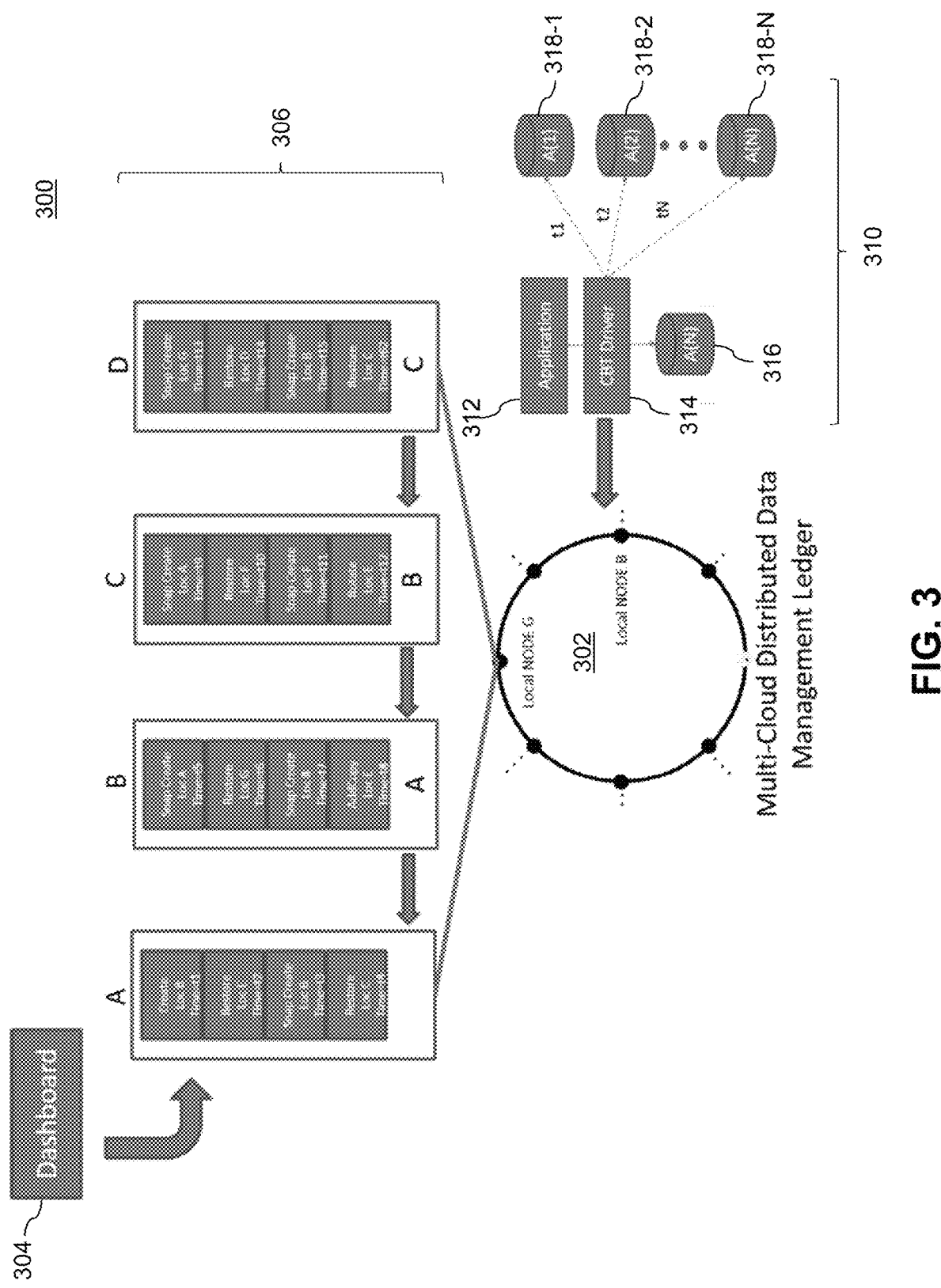
FIG. 3 illustrates a distributed data management ledger system for managing data associated with primary data and/or data protection ecosystems of a cloud computing environment, according to an illustrative embodiment.

FIG. 3 illustrates a distributed ledger system for managing primary data and/or data copies associated with a cloud computing environment 300, according to an illustrative embodiment. As generally illustrated, a plurality of blockchain nodes are operatively coupled to form a multi-cloud distributed data management ledger system 302. A given blockchain node or BCN in the ledger system serves as a local BCN for a given one of the cloud platforms that comprise the cloud computing environment. Thus, as illustratively shown in the distributed ledger system 302 in FIG. 3, respective BCNs (dark circles along the ring representing the ledger) are part of the ledger system for the various cloud platforms in FIG. 1.

In this example, it is assumed that a data protection ecosystem 310 is associated with one of the cloud platforms (e.g., public cloud 108-1) shown in FIG. 1. More particularly, FIG. 3 depicts an application workload 312 that has been assigned to execute on computing resources of public cloud 108-1. It is assumed that this application workload 312 is also executing a data protection algorithm 314 that utilizes changed block tracking (CBT). A CBT data protection algorithm operates on a block storage device and indicates the blocks in the device that have changed since the last backup operation. Thus, in FIG. 3, it is assumed that the data protection ecosystem 310 utilizes CBT and backs up a primary data set 316 (A(N)) as data set copies 318-1, 318-2, . . . , 318-N at different time instances (A(1), A(2), A(N), where N is time t1, time t2, . . . . etc.). It should be understood that CBT is exemplary and any data protection mechanism can be used. CBT will typically be used when trying to move snapshots or snaps (data set copies) across clouds. However, in other cloud platforms, native snapshots and internal mechanism may be used to efficiently create copies. However, the point to be appreciated is that the data protection scenario depicted in FIG. 3 with respect to public cloud 108-1 can occur across every cloud platform within the multi-cloud computing environment.

As contemplated in the distributed data management ledger system 302 depicted in FIG. 3, data protection ecosystem 310 is configured to store one or more transactions on the distributed ledger at a corresponding local BCN such that the one or more transactions are immutably stored on the distributed ledger and securely accessible by the plurality of BCNs in the ledger system. As shown, data protection ecosystem 310 stores as transaction data, on its local BCN, metadata about its data protection operations (e.g., "snap transactions" associated with CBT snapshots or data copies). Further examples of transaction data may include, but is not limited to, metadata about one or more primary data sets, metadata about one or more copied data sets, metadata about one or more restored data sets, metadata about one or more deleted data sets, and other metadata that would be useful for an enterprise to know about data being processed by a given data protection ecosystem in a multi-cloud computing environment. As used herein, "metadata" is generally understood to refer to any data that describes, defines or otherwise characterizes other data. Advantageously, individual primary data and data protection ecosystems within a given cloud now have a gateway blockchain node into which they can record transactions.

Each node (BCN) within a blockchain system (e.g., system 302) contains a full copy of the entire ledger. The distributed ledger can be navigated by a dashboard 304 (graphical user interface) to obtain and present a view 306 of data management/protection activities (events) across a multi-cloud computing environment.

Every data management transaction is entered into the blockchain via the local node. For example, as shown in example in FIG. 3, data protection ecosystem 310 enters transaction data to its local BCN (local node B). These transactions are grouped into "blocks" (A, B, C, D) and the most recent block (D in this example) points back to the last block in the chain (e.g. block "C"). Note that the letter at the bottom of each block refers to the previous block, and block A is called the genesis block since it is the first block created. The view 306 of this chain of blocks can be displayed to a user at any of the local nodes. Given the view 306 (note that the view 306 is only one example of a visualization that can be accessed through dashboard 304), the enterprise is able to ascertain how many primary and protection copies there are across the multi-cloud computing environment, as well as see them being created. Thus, when a primary data set is moved somewhere else in the multi-cloud computing environment, all copies can be moved as well. The same thing is true for deletion operations, i.e., all data set copies of a primary data set can be deleted when the primary data set is deleted. In addition, the accurate count of copies within the multi-cloud computing environment can be used to calculate a more accurate value for a given data set. The enterprise can therefore log the movement, the valuation, and the deletion into the same blockchain (e.g., ledger 302) if desired for audit purposes. It is to be appreciated that a dashboard can be implemented on one or more of the BCNs, one or more computing devices of the enterprise coupled to the distributed ledger system, one or more dedicated computing devices coupled to the system, or some combination thereof.

Given the distributed data management ledger system illustrated in FIG. 3, illustrative embodiments are provided that implement data compliance techniques that address data sovereignty regulations, as described above, in the cloud computing environment managed by the ledger system. These illustrative embodiments will be described below in the context of FIGS. 4A, 4B and 5. However, it is to be appreciated that while embodiments are well-suited for implementation in a ledger system configured as shown in FIG. 3, other ledger systems can be adapted to implement the data compliance management techniques described herein.

Figure 4B:
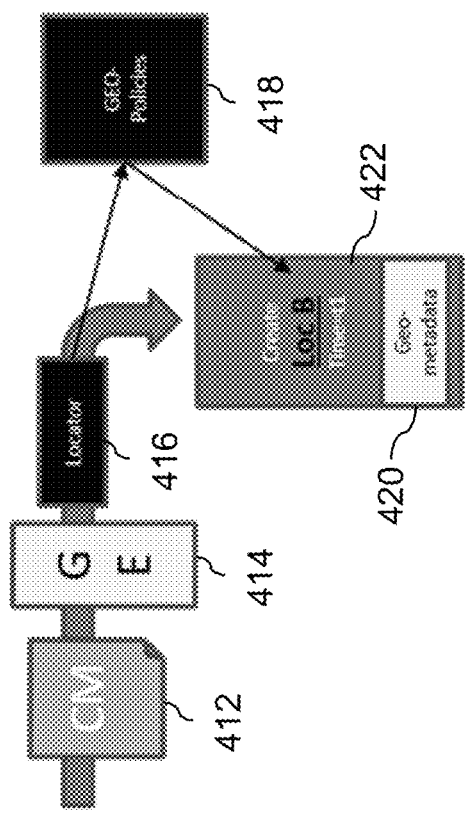
FIG. 4B illustrates content arrival with geo-extraction and geo-based policy placement operations during generation of a transaction with creation metadata that is added to the distributed data management ledger system of FIG. 3.
Figure 4A:
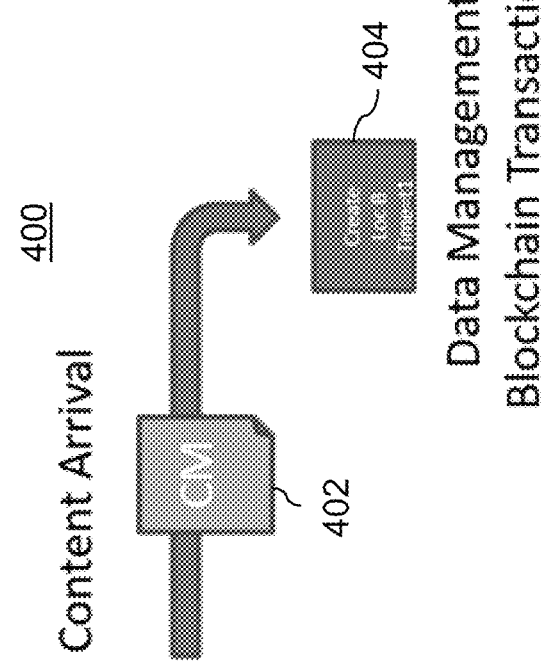
FIG. 4A illustrates content arrival and generation of a transaction with creation metadata added to the distributed data management ledger system of FIG. 3.

FIG. 4A illustrates content arrival and generation of a transaction with creation metadata added to the distributed data management ledger system of FIG. 3. More particularly, FIG. 4A illustrates an example 400 wherein content metadata 402 is created at the time a data set is stored in a given cloud platform that is connected to the distributed ledger system 302 via a local node. Transaction 404 is created and securely stored on the blockchain that is part of the ledger system, as described above.

However, as mentioned above, data sovereignty regulations may dictate that the data set that arrived at the given cloud platform needs to be stored somewhere else, e.g., on a cloud platform within certain geographic boundaries. Illustrative embodiments address this and other scenarios by providing geo-extraction and geo-based policy placement techniques. As used herein, the prefix "geo" is short for "geographic" or "geography."

More particularly, FIG. 4B illustrates content arrival with geo-extraction and geo-based policy placement operations during generation of a transaction with creation metadata that is added to the distributed data management ledger system of FIG. 3. Example 410 is similar to example 400 (FIG. 4A) with the exception that content metadata 412 is presented to a geo-extractor (GE) module 414 which is configured to recognize any kind of geographic point of origin metadata arriving in any protocol and to translate that metadata into a common superstructure or normalized data structure. This normalized geo-metadata (locator) 416 is compared to one or more geo-policies 418 (e.g., GDPR) to determine the proper placement of the associated data set. The geo-metadata is added (embedded) as metadata 420 to the transaction 422 as shown in FIG. 4B.

Advantageously, the geo-metadata 420 drives the placement of the associated content in accordance with the given geo-policies 418. This placement can occur in any number of ways, e.g., placement in data centers with well-known locations, placement on locations using certain IP addresses, etc. FIG. 4B also highlights that once the geo-metadata is extracted from the content, the geo-policies 418 are consulted and the placement of the data (based on the policies) is recorded in the transaction (e.g., LOC B in transaction 422).

Further, as the location of the data is recorded in the transaction, so is a reference to the geo-policy that governed the placement. This reference can be a uniform resource locator (URL), content address, or another suitable pointer.

The creation of a transaction to hold the initial location as well as the point of origin metadata is timestamped, checksummed, and immutably stored as a non-alterable historical record. During an audit, for example, if a piece of content is suspect, the transaction can be considered a trustworthy entry that was immediately entered upon creation of the content.

Still further, an optional checksum of the original data can also be stored in the transaction. This allows further validation that the data originally stored has not been altered.

As protection copies are generated, and/or as copies are restored from a data protection ecosystem, the placement of these copies should also conform to geo-policies. Therefore, the transactions also specify which geo-policy is used for placement, and the transaction can also reference the original transaction that contains the point of origin capture metadata. This reference proves that the enterprise is attempting to comply with the geo-policy.

It can be assumed that the geo-policy will eventually undergo a revision and be put into effect. The approach described above allows the enterprise to determine which data elements were stored under the old policy via a compliance status report. This report can then be fed to automated remediation software to migrate data per the new policy (if necessary).

Figure 5:
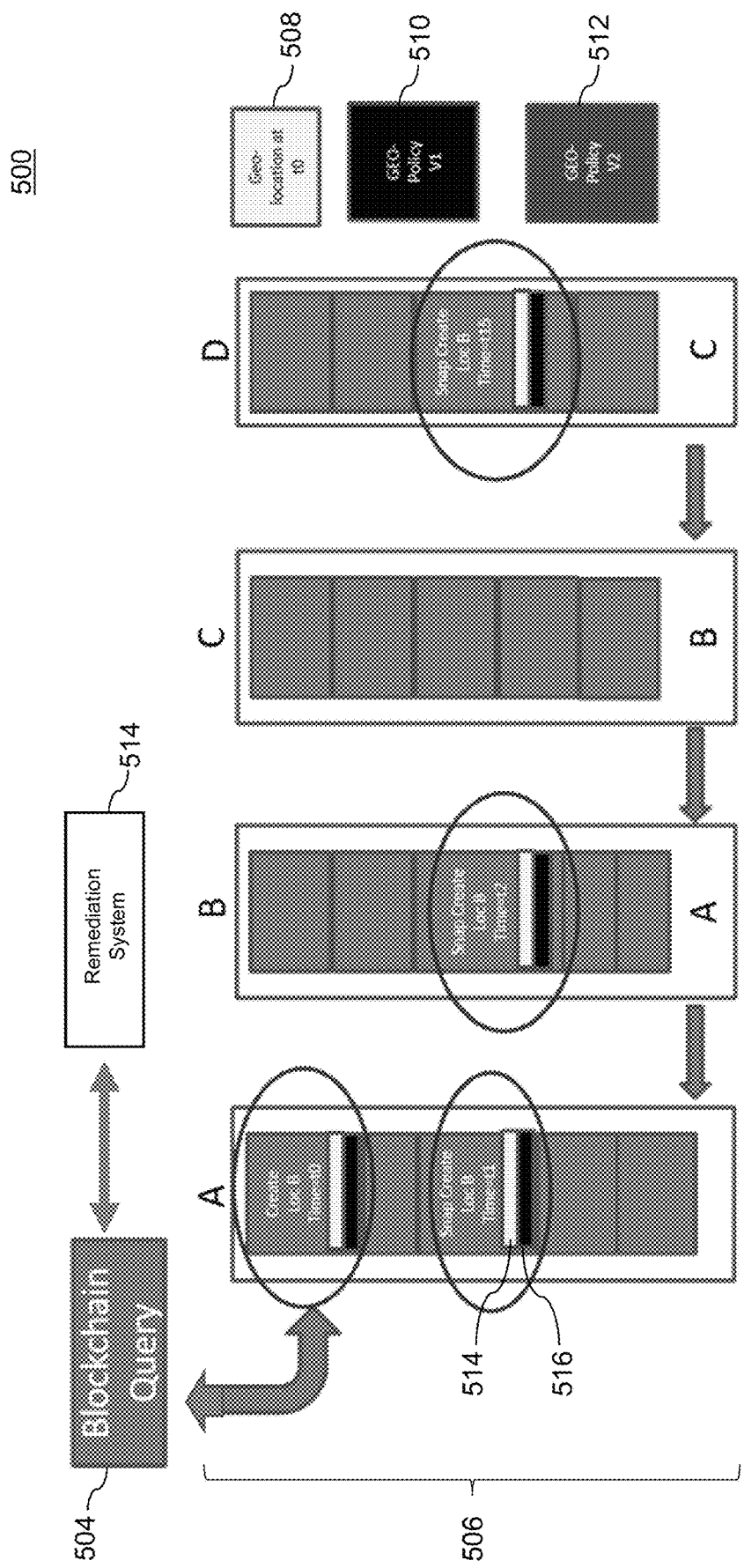
FIG. 5 illustrates an example of searching for data copies placed via an expired policy in the distributed data management ledger system of FIG. 3.

FIG. 5 illustrates data compliance management techniques that consider geo-policy versioning as an example 500. More particularly, FIG. 5 shows a blockchain query 504 that queries a given view 506 of a distributed ledger. FIG. 5 highlights the specific transactions that were placed in specific locations in the ledger based on the captured geo-location (at time t0) 508 and placed via an old policy (V1) 510.

View 506 illustrates all data management operations inserted into blocks (A, B, C, D). It is assumed that the circled transactions have been uncovered by blockchain query 504 which seeks to focus on a given piece of content that was created at time t0. For example, in block A, the geo-location (e.g., 514) was captured at time of creation, which led to a placement at "Data Center B" (Loc B), based on the geo-policy being used at time t0, i.e., GEO-Policy V1 (510) denoted in block A as 516.

Over time, it is assumed that multiple data protection copies for this piece of content were created and the point of origin and geo-policy being used were carried forward at times t1, t2, and t15 and recorded for each transaction.

Eventually, it is assumed that a new version of a geo-policy was created, i.e., GEO-policy V2 (512) and a blockchain query 504 was issued which searched for any copies placed under the old policy. The four circled elements in view 504 were discovered.

This approach allows an enterprise to go back in time and find data locations that may or may not be compliant under the new policy (V2).

This list can be fed to a new placement engine, i.e., remediation system 514 as shown in FIG. 5, if the new policy so dictates. If the new policy does not dictate a movement of the data (i.e., it is within compliance), new transactions can also be generated that record this fact and reference the new geo-policy. It is to be appreciated that, in one or more illustrative embodiments, the remediation system 514 is configured to initiate a series of cascading events to remediate the inappropriate imposition of content into a restricted region.

Figure 6:
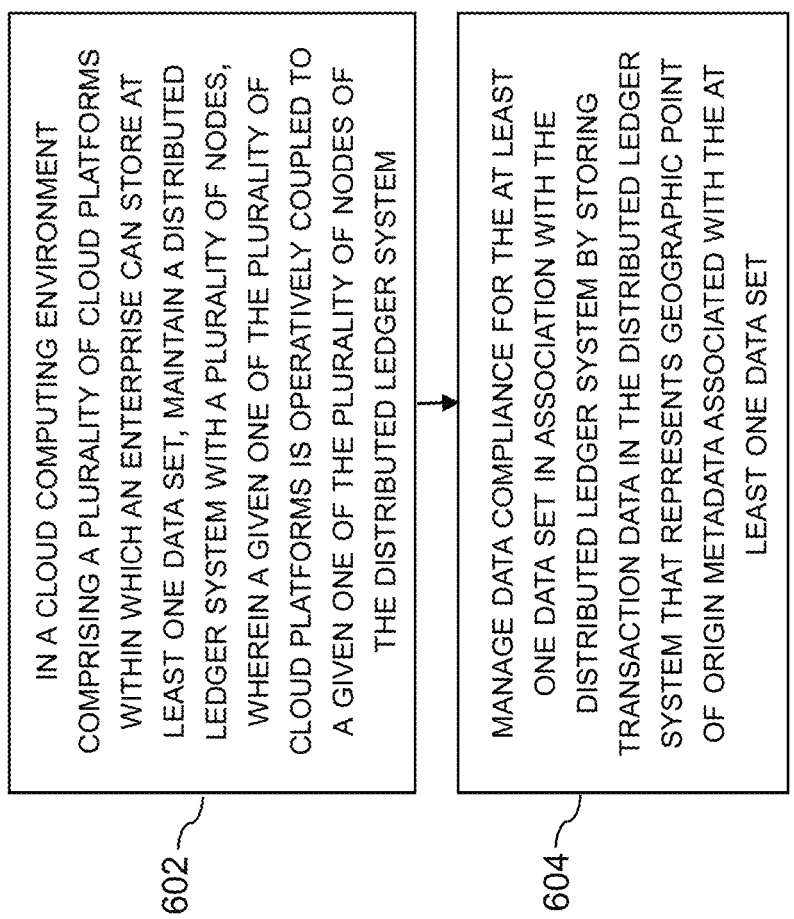
FIG. 6 illustrates a methodology for point of origin capture for data compliance management, according to illustrative embodiments.

Given the illustrative description of data compliance management techniques herein, FIG. 6 depicts a methodology for point of origin data compliance and data placement in a cloud computing environment, according to illustrative embodiments.

In FIG. 6, methodology 600 comprises the following steps. In a cloud computing environment comprising a plurality of cloud platforms within which an enterprise can store at least one data set, step 602 maintains a distributed ledger system with a plurality of nodes, wherein a given one of the plurality of cloud platforms is operatively coupled to a given one of the plurality of nodes of the distributed ledger system. Further, step 604 manages data compliance for the at least one data set in association with the distributed ledger system by storing transaction data in the distributed ledger system that represents geographic point of origin metadata associated with the at least one data set.

At least portions of systems and methods for point of origin data compliance and data placement in a cloud computing environment shown in FIGS. 1-6 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the systems and methods for point of origin data compliance and data placement in a cloud computing environment shown in FIGS. 1-6 may each run on a computer, server, storage device or other processing platform element. A given such element may be viewed as an example of what is more generally referred to herein as a "processing device." An example of such a processing platform is processing platform 700 shown in FIG. 7.

The processing platform 700 in this embodiment comprises a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 7:
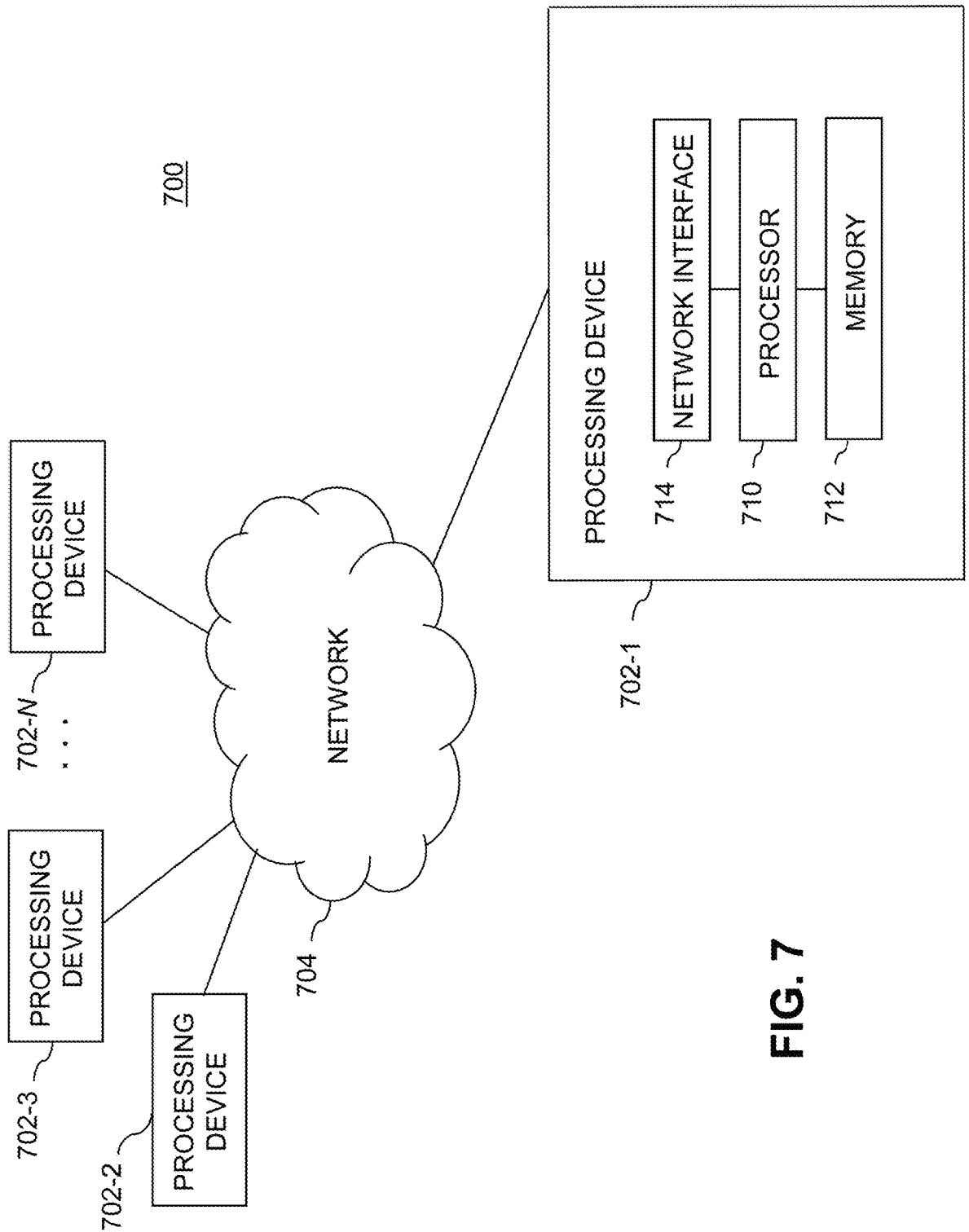
FIG. 7 illustrates a processing platform used to implement a system for point of origin capture for data compliance management, according to an illustrative embodiment.

Also included in the processing device 702-1 of the example embodiment of FIG. 7 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the systems and methods for point of origin data compliance and data placement in a cloud computing environment. Such components can communicate with other elements of the system over any type of network or other communication media.

As indicated previously, in some embodiments, components of the systems and methods for point of origin data compliance and data placement in a cloud computing environment as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   in a cloud computing environment comprising a plurality of cloud platforms within which an enterprise can store at least one data set, maintaining a distributed ledger system with a plurality of nodes, wherein a given one of the plurality of cloud platforms is operatively coupled to a given one of the plurality of nodes of the distributed ledger system; and
   managing data compliance for the at least one data set in association with the distributed ledger system by storing transaction data in the distributed ledger system that represents geographic point of origin metadata associated with the at least one data set;
   wherein the method is implemented via one or more processing devices each comprising a processor coupled to a memory.

2. The method of claim 1, wherein storing transaction data in the distributed ledger system that represents a location of the given one of the plurality of cloud platforms in which the at least one data set has been placed.

3. The method of claim 1, wherein the managing step further comprises storing transaction data in the distributed ledger system that represents a location of a geographic-based storage policy in accordance with which the data compliance for the at least one data set is managed.

4. The method of claim 1, wherein the managing step further comprises time-stamping the transaction data prior to storing the transaction data in the distributed ledger system.

5. The method of claim 1, wherein the managing step further comprises performing a checksum operation on the transaction data prior to storing the transaction data in the distributed ledger system.

6. The method of claim 1, wherein the managing step further comprises performing a data normalization operation on the geographic point of origin metadata prior to storing the transaction data in the distributed ledger system.

7. The method of claim 1, wherein the managing step further comprises storing transaction data in the distributed ledger system that represents a result of a checksum operation performed on the at least one data set.

8. The method of claim 1, wherein the managing step further comprises storing transaction data in the distributed ledger system for a copy of the at least one data set that references the transaction data of the geographic point of origin metadata stored in the distributed ledger system for the at least one data set.

9. The method of claim 1, wherein the managing step further comprises querying the distributed ledger system to determine a compliance status with respect to the at least one data set.

10. The method of claim 9, wherein the managing step further comprises determining, based on the compliance status returned by the querying step, that a current placement of the at least one data set in the given one of the plurality of cloud platforms is no longer compliant with a current geographic-based storage policy.

11. The method of claim 10, wherein the managing step further comprises causing the at least one data set to be moved to a new placement on another given one of the plurality of cloud platforms that is compliant with the current geographic-based storage policy.

12. The method of claim 11, wherein the managing step further comprises updating the distributed ledger system with transaction data that represents the new placement.

13. The method of claim 9, wherein the managing step further comprises determining, based on the compliance status returned by the querying step, that a current placement of the at least one data set in the given one of the plurality of cloud platforms is still compliant with a current geographic-based storage policy.

14. The method of claim 13, wherein the managing step further comprises updating the distributed ledger system with transaction data that represents compliance of the at least one data set with the current geographic-based storage policy.

15. The method of claim 1, wherein the plurality of cloud platforms comprises at least one of private cloud platforms, public cloud platforms, and combinations of one or more private cloud platforms and one or more public cloud platforms.

16. An article of manufacture comprising a non-transitory processor-readable storage medium having stored therein program code of one or more software programs, wherein the program code when executed by at least one processing device causes said at least one processing device to perform steps of:
- in a cloud computing environment comprising a plurality of cloud platforms within which an enterprise can store at least one data set, maintaining a distributed ledger system with a plurality of nodes, wherein a given one of the plurality of cloud platforms is operatively coupled to a given one of the plurality of nodes of the distributed ledger system; and
- managing data compliance for the at least one data set in association with the distributed ledger system by storing transaction data in the distributed ledger system that represents geographic point of origin metadata associated with the at least one data set.

17. A system comprising:
one or more processing devices operatively coupled to one or more memories configured to:
- in a cloud computing environment comprising a plurality of cloud platforms within which an enterprise can store at least one data set, maintain a distributed ledger system with a plurality of nodes, wherein a given one of the plurality of cloud platforms is operatively coupled to a given one of the plurality of nodes of the distributed ledger system; and
- manage data compliance for the at least one data set in association with the distributed ledger system by storing transaction data in the distributed ledger system that represents geographic point of origin metadata associated with the at least one data set.

18. The system of claim 17, wherein the managing step further comprises storing transaction data in the distributed ledger system that re presents a location of the given one of the plurality of cloud platforms in which the at least one data set has been placed.

19. The system of claim 17, wherein the managing step further comprises storing transaction data in the distributed ledger system that represents a location of a geographic-based storage policy in accordance with which the data compliance for the at least one data set is managed.

20. The system of claim 17, wherein the managing step further comprises querying the distributed ledger system to determine a compliance status with respect to the at least one data set.

* * * * *